US 8,014,399 B2

United States Patent
He (10) Patent No.: US 8,014,399 B2
(45) Date of Patent: Sep. 6, 2011

(54) METHOD AND SYSTEM OF OPERATING A NETWORK INCLUDING SENDING TEST PACKETS ONLY WHEN NEEDED

(75) Inventor: Liwen He, Ipswich (GB)

(73) Assignee: British Telecommunications public limited company, London (GB)

(*) Notice: Subject to any disclaimer, the term of this patent is extended or adjusted under 35 U.S.C. 154(b) by 700 days.

(21) Appl. No.: 11/632,772

(22) PCT Filed: Jul. 15, 2005

(86) PCT No.: PCT/GB2005/002802
§ 371 (c)(1),
(2), (4) Date: Jan. 18, 2007

(87) PCT Pub. No.: WO2006/008494
PCT Pub. Date: Jan. 26, 2006

(65) Prior Publication Data
US 2008/0031257 A1 Feb. 7, 2008

(30) Foreign Application Priority Data
Jul. 20, 2004 (GB) .................................. 0416272.3

(51) Int. Cl.
H04L 12/56 (2006.01)
H04L 12/26 (2006.01)
(52) U.S. Cl. .................................. 370/392; 370/395.31
(58) Field of Classification Search .................. None
See application file for complete search history.

(56) References Cited

U.S. PATENT DOCUMENTS

| | | | |
|---|---|---|---|
| 4,745,593 A | 5/1988 | Stewart | |
| 5,684,807 A | 11/1997 | Bianchini, Jr. et al. | |
| 5,870,556 A | 2/1999 | Cote et al. | |
| 5,925,137 A | 7/1999 | Okanoue et al. | |
| 6,363,053 B1 | 3/2002 | Schuster et al. | |
| 6,496,484 B1 | 12/2002 | Suzuki | |
| 6,650,621 B1* | 11/2003 | Maki-Kullas | 370/238 |
| 6,691,169 B1 | 2/2004 | D'Souza | |

(Continued)

OTHER PUBLICATIONS

Pei D et al: "Detection of invalid routing announcements in rip protocol" IEEE Global Telecommunications Conference Globecom '03, vol. 3, Dec. 2003, pp. 1450-1453.*

(Continued)

Primary Examiner — Hassan Phillips
Assistant Examiner — Marcus R Smith
(74) Attorney, Agent, or Firm — Nixon & Vanderhye P.C.

(57) ABSTRACT

A data network, of the type in which a number of interconnected router devices forward received packets of data towards a destination node in accordance with a routing table associated with each router is operated. The network is operated by: receiving routing information at one of the routers, determining if the information is such that, if it were correct, it would cause the router to update its routing table in respect of one or more entries, and, if so, sending out two test packets, one of which is sent out according to the existing information contained in the routing table and the other of which is sent out according to the information which would be included in the routing table if it were updated in accordance with the received information; comparing the results of the two test sendings; and updating the routing table to reflect the received information if the comparison indicates that the received information is correct, but otherwise ignoring the information and maintaining the routing table unchanged.

20 Claims, 4 Drawing Sheets

U.S. PATENT DOCUMENTS

| | | | |
|---|---|---|---|
| 6,778,502 B2* | 8/2004 | Ricciulli | 370/238 |
| 7,391,731 B1* | 6/2008 | Skelly et al. | 370/238 |
| 2002/0110089 A1* | 8/2002 | Goldshtein et al. | 370/252 |
| 2002/0165957 A1 | 11/2002 | Devoe et al. | |
| 2002/0186665 A1* | 12/2002 | Chaffee et al. | 370/255 |
| 2002/0199016 A1* | 12/2002 | Freedman | 709/241 |
| 2003/0112809 A1 | 6/2003 | Bharali et al. | |
| 2003/0204619 A1 | 10/2003 | Bays | |
| 2004/0105392 A1* | 6/2004 | Charcranoon | 370/252 |
| 2005/0135369 A1* | 6/2005 | Galand et al. | 370/392 |

OTHER PUBLICATIONS

GB Search Report dated Nov. 22, 2004.
International Search Report dated Apr. 27, 2006.
Wan et al., "S-RIP: A Secure Distance Vector Routing Protocol", circa 2003.
He, "A Verified Distance Vector Routing Protocol for Protection of Internet Infrastructure", Lorenz et al (Eds.): ICN 2005, LNCS 3421, pp. 463-470, 2005.
Murphy, "BGP Security Vulnerabilities Analysis", pp. 1-17, http://www.ietf.org/internet-drafts/draft-ietf-idr-bgp-vuln-00.txt.

* cited by examiner

METHOD AND SYSTEM OF OPERATING A NETWORK INCLUDING SENDING TEST PACKETS ONLY WHEN NEEDED

This application is the US national phase of international application PCT/GB2005/002802 filed 15 Jul. 2005 which designated the U.S. and claims benefit of GB 0416272.3, dated 20 Jul. 2004, the entire content of which is hereby incorporated by reference.

BACKGROUND

1. Technical Field

The present invention relates to a method of operating a network. In particular, the present invention relates to a method of operating a data network or internetwork (i.e. a collection of different networks linked together, the most well known example of which is the Internet), as well as to a network or internetwork operating in accordance with such a method and individual devices operable to carry out such a method within such a network.

2. Related Art

The Internet is a collection of different packet-switched networks linked together to form an internetwork. In order to successfully send data from one node on the Internet to another, a protocol referred to as the Internet Protocol (IP) is used. This enables an IP datagram to be routed through the Internet from a transmitting or originating source node to a receiving or terminating destination node. As will be well known to persons skilled in the art of data networks, IP is a layer 3 or network layer protocol when compared with the ISO seven layer reference model of data networks. This essentially means that it is responsible for carrying data over multiple hops across a network or internetwork. Thus at each hop the ultimate IP address is read and an onward route is selected unless the data happens to have arrived at the destination node in which case it is passed up the layer stack.

Thus, IP is a data-oriented protocol used by source, destination and intermediate nodes (which might, for example, be a web server, a web client and multiple routers respectively) for communicating data across a packet-switched network (or, more usually, an internetwork). Furthermore, IP has the property that no specific set-up process is required before a source node attempts to transmit data to a destination node, irrespective of whether the nodes have previously communicated with one another before and irrespective of the type of data to be transmitted.

In order to achieve this, IP specifies that data is transmitted in IP datagrams, each of which comprises a header portion and a payload portion. The data to be transmitted (or a portion of it) is carried in the payload portion of an IP datagram whilst the header contains information which enables intermediate routers to process the datagram as a whole in an appropriate manner to try to deliver it to the destination node.

As mentioned above, IP represents only one layer out of many provided by an internetwork in order to enable data to be successfully transmitted over the internetwork which, by comparison with the seven layer OSI Reference Model, corresponds approximately to level 3, the Network level. "Beneath" the network layer is both a data link layer and a physical layer, and therefore each IP datagram is likely to be encapsulated within one or more lower layer (i.e. the link layer) data packets for transmission from one node on a network to another on the same network. However, each node will "strip out" the IP datagram from the received packet(s) and pass this to an IP function within each intermediate node, as well as at the destination node. The IP function within each intermediate node then reads the IP header portion to determine if it is the destination node. If it is the destination node, it will pass the contents of the payload portion of the IP datagram to the next layer function identified in the header portion of the IP datagram (e.g. to a Transport Control Protocol (TCP) function or to a User Datagram Protocol (UDP) function), if not, it will try to forward on the IP datagram towards the destination node—the mechanics of this are described in greater detail below. Intermediate nodes which are connected to multiple different networks and which are therefore important interconnecting nodes having often many direct connections with other nodes are typically known as routers or gateways and usually perform data transfer as their sole or primary purpose.

Internetworks can generally be considered as hierarchical entities which can be viewed at different scales. At a high level scale one can consider so-called Autonomous Systems (AS's). These will generally be connected together to form an internetwork of AS's. Each AS will typically comprise a network itself or even an internetwork, itself being formed from a number of smaller networks or subnetworks. Routers which connect different AS's together are often referred to as Border Gateways. In order to route traffic over an internetwork formed from a plurality of AS's, each AS maintains a routing table setting out to which neighbouring AS traffic should be sent in order to reach any given IP destination address. In some internetworks, these routing tables may be maintained in an autonomous manner using one of the inter-domain routing protocols (a domain is an AS) known as Border Gateway Protocol (BGP) of which the most current version at the filing date of the present application is BGP version 4. With BGP Transport Control Protocol (TCP) connections are established between AS's in order to transfer routing information between border gateway routers.

Within an autonomous system, a similar mechanism is used to route IP datagrams through the network from one point to another in which the routers again maintain a routing table. However, instead of using BGP, an Interior Gateway Protocol (IGP) is used instead. There are a number of IGP's currently in use. One popular IGP for relatively small networks is Routing Information Protocol (RIP) which uses the User Datagram Protocol (UDP) to transmit routing information between co-operating routers instead of forming TCP connections. Using RIP, a gateway host (with a router) sends its entire routing table (which lists all the other hosts it knows about) to its closest neighbour host every 30 seconds. The neighbour host in turn passes the information on to its next neighbour and so on until all hosts within the network have the same knowledge of routing paths, a state known as network convergence. RIP uses a hop count as a way to determine network distance. (Other protocols use more sophisticated algorithms that may, for example, include timing as well.)

Another popular IGP is Open Shortest Path First (OSPF) protocol. This is similar to RIP except that it has less overhead because it only transmits messages when there has been a change in a router's routing table. Also, it transmits more information than is transmitted in RIP.

All of these routing table updating mechanisms however have issues over security. In particular, there is a danger that a router could be "hacked" and then succumb to the control of a malicious third party who could then send spurious routing update messages to neighbouring routers and send the system into chaos, causing large numbers of lost or heavily delayed packets (e.g. by informing all neighbouring routers that it represents the best next hop to all destinations and then simply throwing away any received packets rather than forwarding them on). Moreover, by analysing control and data traffic, confidential information carried in the traffic may be exposed via the hacked router to unauthorised third parties.

Most attempts to deal with security issues involving routers have concentrated on authenticating communications between routers so that so-called "man-in-the-middle" and similar types of attack are prevented (or at least rendered more difficult). However, such approaches involve a significant amount of overhead, both in terms of processing cycles (to perform encryption and decryption) and in terms of extra information being broadcast (digital signatures, hash functions, etc.). Furthermore, they are wholly ineffective against the risk of "hacked" legitimate routers.

BRIEF SUMMARY

According to the present exemplary embodiment, there is provided a method of operating a data network, of the type in which a number of inter-connected router devices forward received packets of data towards a destination node in accordance with a routing table associated with each router, the method comprising: receiving routing information at one of said routers, determining if the information is such that, if it were correct, it would cause the router to update its routing table in respect of one or more entries, and, if so, sending out two test packets, one of which is sent out according to the existing information contained in the routing table and the other of which is sent out according to the information which would be included in the routing table if it were updated in accordance with the received information; comparing the results of the two test sendings; and updating the routing table to reflect the received information if the comparison indicates that the received information is correct, but otherwise ignoring the information and maintaining the routing table unchanged.

This method has the following advantages compared to prior art methods: there is very little "overhead"—the two test sendings may comprise two small test packets, no encryption or decryption is required, and the test packets only need to be sent when the received information is such that it would cause a change in a routers stored routing table; it is effective against a large number of different attacks including hacked router attacks—since the method advantageously checks all information which would cause a change in a router's routing table regardless of where the information comes from (or alleges to have come from) it is effective in countering all sorts of attacks including man-in-the-middle type attacks as well as "hacked" router type attacks; very simple to introduce to current routers—no significant additional hardware is required to implement this method in existing routers, all that is required is some relatively simple additional software; non-exclusive—it does not preclude other types of security measures being used in addition.

Preferably, the routing tables are IP routing tables for routing IP datagrams and fragments of datagrams. Preferably the test packets are Internet Control Message Protocol (ICMP) messages. The messages may be echo request messages or, more preferably where the destination supports these, timestamp request messages. Preferably the sequence numbers of the request messages are determined by generating one number randomly and then setting the sequence number of the other test message in dependence upon the randomly generated number (e.g. $n_{RANDOM}$ and $n_{RANDOM}+1$). Preferably the test messages include data padding in order to make the messages more difficult to detect as ICMP messages using "packet-sniffers".

According to a second aspect of the present invention, there is provided a method of operating a router within a data network or internetwork in which data packets may be sent from a source node within the network or internetwork to a destination node via multiple hops between adjacent routers, wherein the router maintains a routing table and determines how to forward received data packets requiring onward transmission by consulting the routing table, the method comprising receiving network configuration information, determining if the information indicates that the router should modify its routing table in respect of one or more entries, and, if so, performing a test to establish whether or not the routing table should in fact be modified in the manner indicated by the received information, and if so to update the routing table accordingly, but otherwise to leave the routing table unamended.

According to a third aspect of the present invention, there is provided a router for use in a data network, the router comprising: storage means for storing a routing table; a plurality of communication ports for transmitting data to and receiving data from interconnected nodes when the router is in use as part of an interconnected network or internetwork of nodes or networks; and a processor or group of processors for processing information received at one or more of the communication ports concerning network configuration, and for updating the routing table in accordance with the received network configuration information, characterised in that the processor or group of processors is additionally operable, upon receipt of new network configuration information, to determine if the information indicates that the router should modify its routing table in respect of one or more entries, and, if so, performing a test to establish whether or not the routing table should in fact be modified in the manner indicated by the received information, and if so to update the routing table accordingly, but otherwise to leave the routing table unamended.

Preferably, the test comprises sending out a pair of test packets in respect of the or each entry which the router determines ought to be changed in view of the received network configuration information, wherein one of the test packets of the or each such pair is sent out according to the existing information contained in the routing table and the other of which is sent out according to the information which would be included in the routing table if it were updated in accordance with the received information.

Naturally, instead of modifying the routing table only after the results of the test have confirmed that such a modification is appropriate, the router could instead modify the routing table immediately but then revert the table back to its previous state if the test indicates that the modification should not in fact have been made after all.

According to a fourth aspect of the present invention, there is provided a network or internetwork comprising a plurality of routers according to the third aspect of the present invention.

According to a fifth aspect of the present invention, there is provided a computer program or suite of computer programs for carrying out the method of either the first or the second aspect of the present invention during execution and/or a carrier medium such as a non-transient carrier medium carrying such a program or suite of programs.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EXEMPLARY EMBODIMENTS

Figure 1:
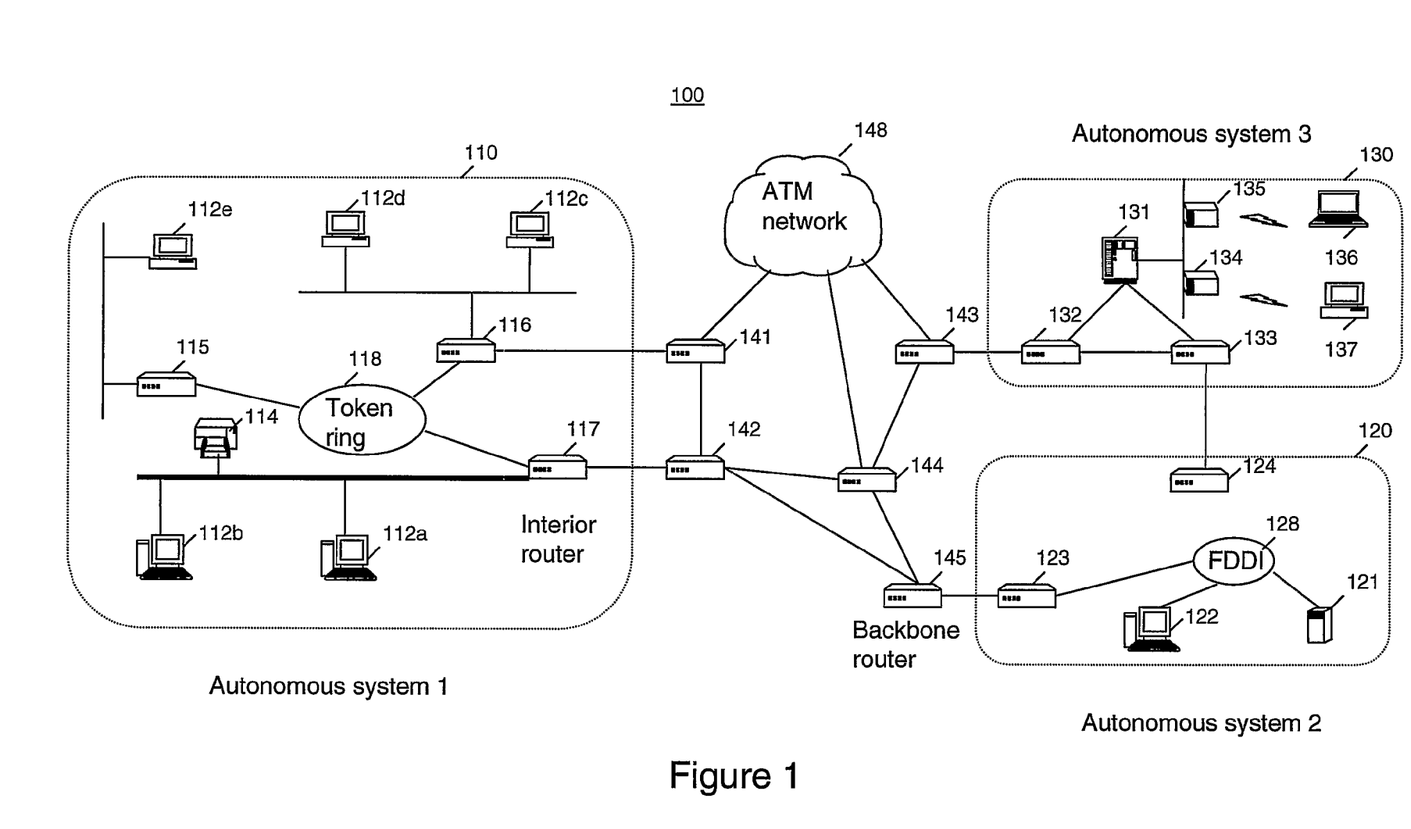
FIG. 1 is a schematic illustration of a data internetwork which is suitable for implementing an embodiment of the present invention.

Referring firstly to FIG. 1, the typical structure of a data internetwork as it relates to the present invention is discussed.

Structure of a Data Internetwork

FIG. 1 shows an internetwork 100 comprising a plurality of Autonomous Systems (AS's) 110, 120, 130 connected together via a backbone ATM network 148 including a plurality of backbone routers 141-145. In this example, AS 110 comprises five workstations 112a-e connected together via a token ring Local Area Network (LAN) 118. AS 10 also includes a printer 114 and three interior routers 115, 116 and 117 all of which are also connected together by the token ring LAN 118. AS 12 comprises a workstation 122, a server 121 and two routers 123 and 124 all connected together via a Fibre Distributed Data Interface (FDDI) LAN 128. AS 130 comprises a server 131, two wired routers 132, 133 and two wireless routers 134, 135 which provide wireless connections to a laptop computer 136 and a desktop computer 137 respectively. It is not explicitly illustrated in FIG. 1 what type of LAN technology is used for linking together the components of AS 130 but it could, for example, be a simple Ethernet LAN.

In order to place the present invention in context, there will now be described in overview, the steps taken to transmit a packet of data from a first device 112a (hereinafter referred to as node 112a) on the internetwork 100 to a second device 136 (hereinafter referred to as node 136). When the IP function within node 112a receives a packet of data to be transmitted, it firstly checks whether the destination node is local to it (i.e. if it's for either of nodes 112b or 114). Since in this case the destination node (node 136) is not local to node 112a, it transmits the data packet to its local router 117. Router 117 examines the destination address and determines that it is outside AS 110 and thus determines that it needs to be sent to a gateway router having access to external networks. In the present case, router 117 is such a gateway router and thus it is able to forward the packet onto external router 142. External or backbone router 142 consults its router table to determine the currently preferred next hop for traffic to the network on which node 136 is located; for the purposes of the present example, we can assume that AS 3 is associated with its own unique network. Router 142 might therefore discover upon consulting its router table that router 144 is the currently preferred next hop destination, which in turn, may discover that router 143 is its currently preferred next hop destination for traffic to the network associated with AS 130. At router 143 it is determined that it has a direct link to gateway router 132 within AS 130 and the packet is therefore sent to router 132. Router 132 then consults its router table to look for node 136 (or more precisely, the IP address of node 136). Since node 136 in this case is a mobile device (a lap-top computer), it may well currently have a dynamically assigned temporary IP address assigned to it by wireless modem 135 which may have a limited number of IP addresses which it can dynamically assign to devices connecting to it and all of which will be known to the routers within AS 130 as being accessible from node 135; router 132 will therefore determine from its router table that device 131 is the next hop for traffic from router 132 heading towards node 135. At server 131 it will it again determines from its router table that the destination IP address is associated with node 135 and it therefore transmits the packet directly to wireless modem 135 which finally transmits the packet over the wireless link to laptop computer 136.

From the above discussion, it can be seen that in order to transmit data over an internetwork between two devices on separate networks, each packet is transmitted between a large number of nodes all of which act as routers (except for the origin and destination nodes) some of which are internal routers and some of which are back-bone routers with gateway routers straddling these two different domains. At each router, an internal routing table is consulted to determine the next hop for the packet. The sort of structure whereby internal routers have a detailed knowledge of the location of devices within its network and a single or only a very few default type options for dealing with traffic bound for external destinations and external routers have no knowledge of the internal structure of different networks belonging to autonomous systems but detailed knowledge of how to reach an ingress point to different networks connected to the back-bone network (which contains the external routers) is common. Such a structure is also scalable such that an internetwork such as that shown in FIG. 1 could actually form a subnetwork (or a sub-internetwork) of a larger collection of subnetworks (or sub-internetworks), linked together by an even fatter backbone network, etc.

The present invention relates to the way in which routers update their routing tables. It should apply equally to all such methods. In particular, it is applicable to algorithms used for updating the routing tables of internal routers as well as to algorithms used for updating external routers. The following discussion therefore explains how the present invention may be applied to both a typical algorithm used for updating internal routers (namely the Routing Information Protocol (RIP)) and a typical algorithm used for updating routing tables within external or gateway routers (namely the Border Gateway Protocol (BGP)). Of course, as mentioned above, the present invention may be applied equally to other routing protocols in a corresponding manner to the manner in which it is illustrated below as being applied to RIP and BGP.

Briefly, in RIP, packets are normally forwarded via the router recorded as having the lowest cost to that destination. The routing table only retains records corresponding to the lowest cost route for each destination (basically in the form of a list of destinations and the 'cost'—e.g. based on hop count—of reaching them from that router). In BGP, the update message of each router includes the newest routing paths to all reachable destinations. This message is broadcast periodically. Before a router relays this update message to its neighbours, it appends their own AS identifier (AS number). In addition, BGP also facilitates the ranking of multiple alternative routes based on a set of pre-defined routing policies.

RIP

In RIP, each router maintains a routing table indexed by, and containing one entry for, each router in the subnet. The entry contains two parts: the preferred outgoing link to use for that destination, and an estimate of the cost to that destination. The metric of cost might be number of hops, time delay in milliseconds, total number of packets queued along the path or something similar. If delay is used as a metric, the router can measure it directly with special ECHO packets that the receiver just timestamps and sends back as fast as it can (note that this is a function specified by the Internet Engineering Task Force (IETF) in RFCs 792 and 1122 as belonging to the Internet Control Message Protocol (ICMP) and which must be provided by "every host" implementing IP).

As an example, assume that the router knows the delay to each of its neighbours. Once every T msec each router sends to each neighbour a list of its estimated delays to each router in the subnet (e.g. within an Autonomous System). It also receives a similar list from each of its neighbours. Imagine that one of these tables has just come in from neighbour X, with Xi being X's estimated of how long it takes to get to the node i. If this router knows that the delay to its neighbour X is m msec, it also knows that it can reach node i via X in (Xi+m) msec via X. By performing this calculation for each neighbour, a router can find out which estimate seems the best and use that estimate and the corresponding link in its new routing table. Note that the old routing table is not used in the calculation.

BGP

In BGP, pairs of BGP routers communicate with each other by establishing TCP connections. Operating this way provides reliable communication and hides all the details of the network being passed through. BGP is fundamentally a distance vector protocol, but quite different from RIP. Instead of maintaining just the cost to each destination, each BGP router keeps track of the exact path used. Similarly, instead of periodically giving each neighbour its estimated cost to each possible destination, each BGP router tells its neighbours the exact path it is using.

Besides the RIP/BGP routing table being built upon second hand information, this information is never actually verified in the conventional and widely used RIP and BGP protocols. For example, if router R claims to have the best route to a given network, none of the other routers verify this information. In fact, they do not even verify that this information was sent from router R or that router R even exists! Needless to say this lack of verification can be a gaping security hole. It is not all that difficult to propagate bogus routing information and bring an entire network to its knees. This is a clear example of how one savvy but malicious user can interrupt communications for an entire IP network. Though the enhanced versions RIP 2 and BGP 4 include a simple authentication mechanism, there is still a lot to be desired.

In the sections below, two embodiments of the present invention are described. In essence, the embodiments are modifications of the RIP and BGP protocols respectively in which routing information sent by neighbouring routers is verified prior to using the information to update routing tables. The modified RIP and BGP protocols, used as examples to illuminate the invention are referred to below as Verified-RIP (V-RIP) and Verified-BGP (V-BGP).

V-RIP

In this method, instead of naively updating its routing table as soon as a new update message is received from any of its neighbours, in this method the router first verifies that the information is reasonably likely to be correct. The exact steps performed in the present embodiment to achieve this verification are set out below. Reference in the discussion below is made both to FIG. 2 which shows a greatly simplified network structure comprising a plurality of nodes A to L (note when describing V-RIP it is assumed that these nodes are all internal routers whereas when we are describing V-BGP it is assumed that these nodes are all external routers); reference is also made to FIGS. 3 and 4 which illustrate the steps involved by means of flowchart diagrams.

Figure 3:
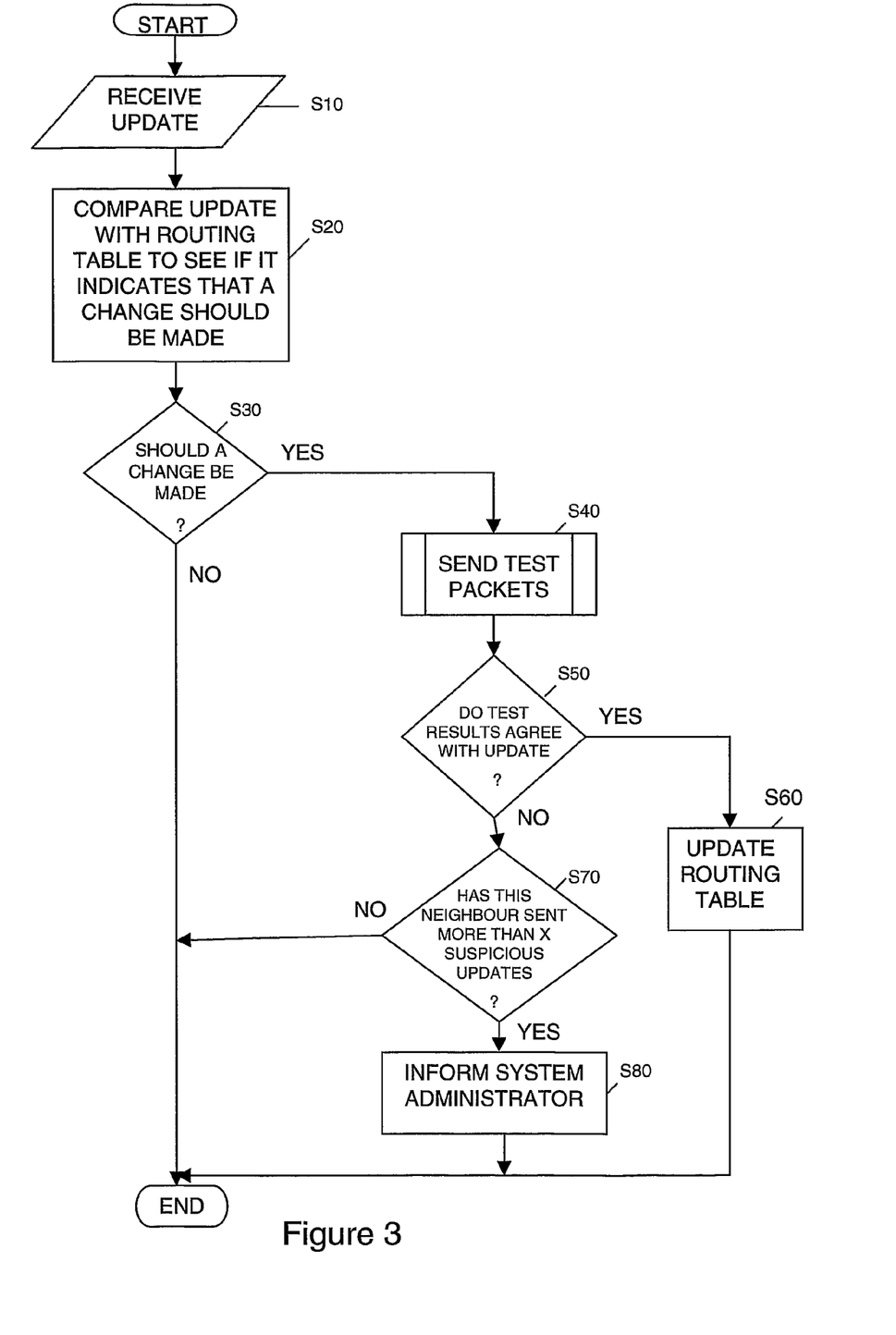
FIG. 3 is a flow chart illustrating a method of operating a router according to an embodiment of the present invention.

1. When a router receives an update message from its neighbours, it does not update its routing table immediately, instead, it analyses the new message by comparing it with its current routing table for RIP (S10).

2. As an example using delay as a metric, in FIG. 2, router J, regularly receives routing information updates from its neighbouring routers A, I, H and K. In router J, the two consecutive (last and current) routing update messages from all neighbouring routers are stored.

3. Each time router J receives an update it checks (S20) the update with its current routing table to see if it indicates that a change should be made to the routing table (e.g. if it identifies a significant decrease in the delay to router D by comparing the routing table (which is normally formed from the last set of routing update messages sent from its neighbours) with the current update sent by router A). (Note: in practice, if, for example, A advertises bogus routing information with a greater delay, A will be automatically isolated from the network because a router would rarely transmit traffic via router A.)

4. If (at decision step S30 in FIG. 3) the update indicates that there is not likely to be any impact on the router's decisions (e.g. because it does not indicate that any destinations will be reached more quickly via A than would previously have been reached more quickly by another first hop router) router J takes no action (and the method ends).

5. If however (at decision step S30) the update does indicate that there is likely to be an impact on the router's decisions (for example because the update indicates that router D can now be reached much more quickly via router A than via router H), router J timestamps and sends (at subroutine S40) two diagnostic packets with different sequence numbers and random amounts of padding to the affected router (e.g. router D) via two different routes. One route is via the "new" router (e.g. router A), another one is via the current next router for the affected destination node (e.g. router D) in the current routing table of router J. Upon receipt of the diagnostic packets the destination router (e.g. router D) just sends two reply packets back as fast as it can (possibly after timestamping the packets in some way if appropriate depending on the exact nature of the diagnostic packets). By noting the time of receipt of these two reply packets corresponding to the two diagnostic packets and comparing these receipt times with the times of transmission of the original diagnostic packets, router J calculates which route is shortest according to the packet travelling time between the two routes.

6. If (at step S50) it is determined that the new route advertised by router A has a packet travelling time which is less than that of the route currently suggested by the routing table, it is reasonable to assume that the information contained in the recently received update (e.g. from router A) is correct, and router J therefore updates its routing table as usual (at step S60) and renews its set of routing messages sent by all neighbours (i.e. by deleting the current "previous update" and moving the current "current update" (i.e. the newly received update) into "previous update").

7. If, however, (at step S50) it is determined that the new route advertised by router A has a packet travelling time which is not less than that of the route currently suggested by the routing table, it is reasonable to be suspicious of the new routing information from router A and therefore router J does not update the routing table using the routing information from router A. Furthermore the newly received update is simply discarded and no change is made to the value stored in the "previous update" field. If (at step S70) it is determined that the anomaly keeps on happening (e.g. if more than a predetermined number of consecutive suspicious and therefore discarded updates are received), router J (at step S80) sends an alert to its system administrator before ending the method.

In the above manner, using this simple verification, bogus routing information from mis-configured or malicious routers can be filtered and terminated by its honest neighbouring routers.

Figure 2:
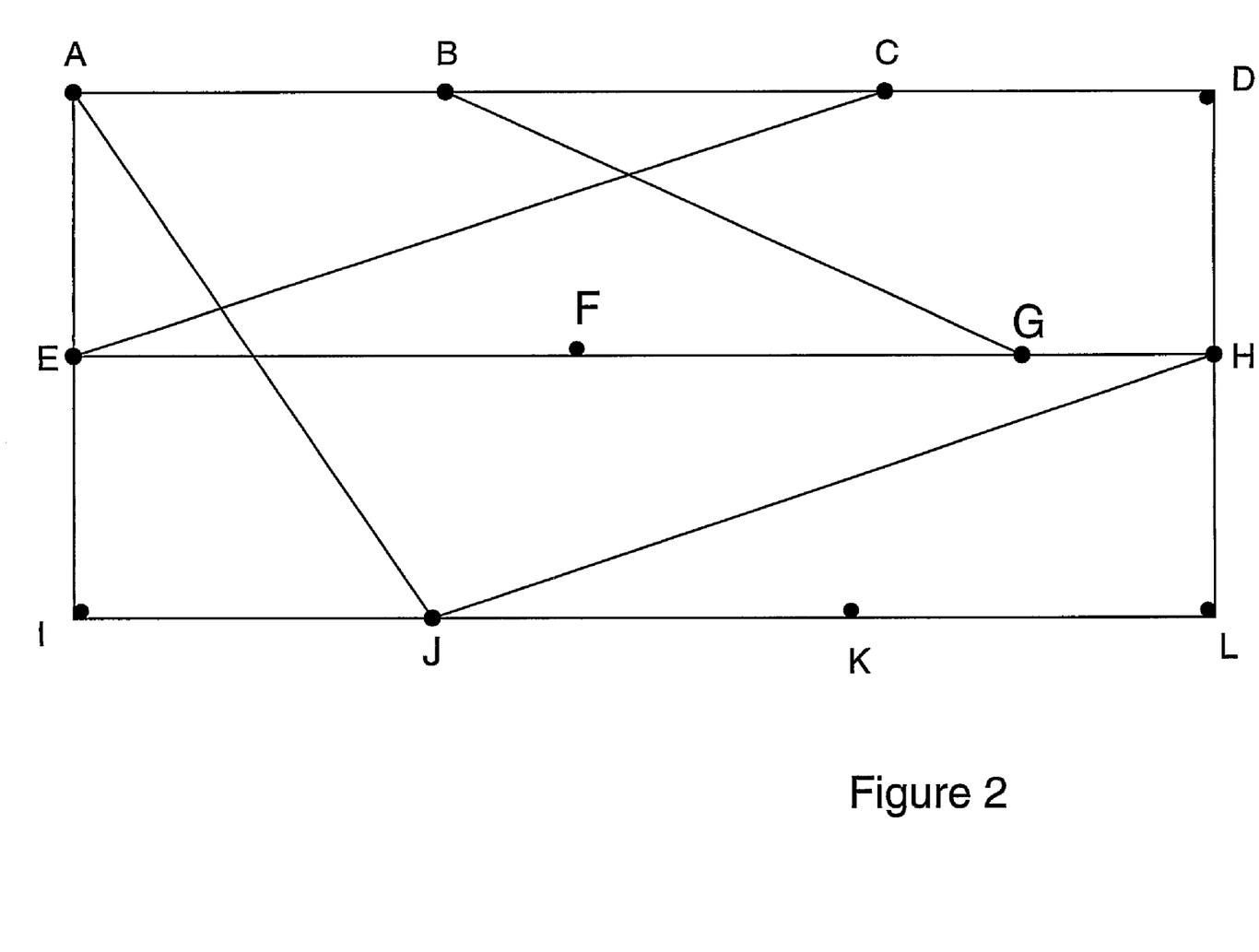
FIG. 2 is a stylised illustration of a network implementing an embodiment of the present invention.

The above described process is now illustrated by way of the following example which refers to FIG. 2 and Tables 1 and 2

Table 1 shows the measured times from router J to its 4 neighbours, the routing messages from A, I, H, K recorded in router J at time T and the routing table generated by router J from these two sets of information. Generally, if all of the routing information is normal, router J computes a new routing table (as displayed in the far right 3 columns of Table 1) each time it receives a new set of updates from its neighbouring nodes, as has been done in Table 1.

TABLE 1

| Times to neighbours | | "Current Updates" from neighbours (At time T) | | | | Routing table (From J) | | |
|---|---|---|---|---|---|---|---|---|
| To | From J | To | From A | From I | From H | From K | To | Delay | First Hop |
| A | 8 | A | 0 | 24 | 20 | 21 | A | 8 | A |
| I | 10 | B | 12 | 36 | 31 | 28 | B | 20 | A |
| H | 12 | C | 25 | 18 | 19 | 36 | C | 28 | I |
| K | 6 | D | 40 | 27 | 8 | 24 | D | 20 | H |
|  |  | E | 14 | 7 | 30 | 22 | E | 17 | I |
|  |  | F | 23 | 20 | 19 | 40 | F | 30 | I |
|  |  | G | 18 | 31 | 6 | 31 | G | 18 | H |
|  |  | H | 17 | 20 | 0 | 19 | H | 12 | H |
|  |  | I | 21 | 0 | 14 | 22 | I | 10 | I |
|  |  | J | 9 | 11 | 7 | 10 | J | 0 | — |
|  |  | K | 24 | 22 | 22 | 0 | K | 6 | K |
|  |  | L | 29 | 33 | 9 | 9 | L | 15 | K |

For illustration, consider how J computes its new route to router D. Router J knows that it can get to its neighbour A in 8 msec, and A claims to be able to reach D in 40 msec, so J assumes it can reach D via A with a delay of (8+40) 48 msec. Similarly, J assumes it can reach D via I with a delay of (10+27) 37 msec, via H with a delay of (12+8) 20 msec and via K with a delay of (6+24) 30 msec. The minimal delay is therefore 20 msec (via neighbour H). So in J's routing table the route to D specifies a delay of 20 msec and a first hop destination of H.

TABLE 2

| Times to neighbours | | "Current Updates" from neighbours (At Time T + 1) | | | | Routing table | | |
|---|---|---|---|---|---|---|---|---|
| To | From J | To | From A | From I | From H | From K | To | Delay | First Hop |
| A | 8 | A | 0 | 24 | 20 | 21 | A | 8 | A |
| I | 10 | B | 12 | 36 | 31 | 28 | B | 20 | A |
| H | 12 | C | 25 | 18 | 19 | 36 | C | 28 | I |
| K | 6 | D | 10 | 27 | 8 | 24 | D | 18 | D |
|  |  | E | 14 | 7 | 30 | 22 | E | 17 | I |
|  |  | F | 23 | 20 | 19 | 40 | F | 30 | I |
|  |  | G | 18 | 31 | 6 | 31 | G | 18 | H |
|  |  | H | 17 | 20 | 0 | 19 | H | 12 | H |
|  |  | I | 21 | 0 | 14 | 22 | I | 10 | I |
|  |  | J | 9 | 11 | 7 | 10 | J | 0 | — |
|  |  | K | 24 | 22 | 22 | 0 | K | 6 | K |
|  |  | L | 29 | 33 | 9 | 9 | L | 15 | K |

Table 2 shows the routing messages from A, I, H, K recorded in router J at time T+1 together with the new routing table that would result from the new updates either, in the conventional case, straight away, or, according to the present embodiment, once the relevant aspect or aspects of the newly received updates has or have been verified. It is obvious that router A claims a significant decreasing of delay to router D from its previously advertised delay of 40 msec down to 10 msec. When Router J routinely calculates the delay to D via A, it therefore determines that the new delay is only (8+10=) 18 msec via A. Clearly, the new delay of 18 msec is smaller than J's current minimal delay value 20 msec and the quickest route to D according to the current updates received from all of its neighbours at time T+1 is now therefore via A (the next quickest route is 20 msec via H).

Therefore, according to the present embodiment, J now attempts to verify the routing message from A (whilst in the meantime maintaining a copy of the update messages received at time T—in fact, in the present invention, Table 2 is not actually generated at all until the test has been completed such that any packets received in the meantime are forwarded according to the routing table of Table 1 until the new updates have been verified where necessary). In order to perform the verification, router J timestamps and sends two diagnostic packets P and Q, which are similar except that they have different sequence numbers, to router D via two different routes. Packet P travels to D via router A, whilst packet Q travels to D via H, the current next router for destination D in the current routing table of router J (i.e. according to Table 1). Upon receipt of the diagnostic packets, router D replies back with two response packets, preferably as fast as it can. Furthermore, if router D supports such a feature, it may timestamp the packets to show exactly when the test packets are received by router D and possibly also when the reply packets leave router D.

If the two response packets are both received back prior to a timeout occurring, router J determines which diagnostic packet makes it to destination router D first (or at least which one makes it back first). According to the present embodiment, provided the packet via the new route is determined to have the least delay (i.e. provided router J finds that the return time for diagnostic packet P is shorter than the return time for diagnostic packet Q) it assumes that the recent update from neighbour A is correct and it updates its table according to Table 2 (i.e. it places 18 msec via A as its newest estimated delay to D in its routing table).

If, on the other hand, router J determines that the diagnostic packet sent via the new route does not make it to its destination first (i.e. router J finds that the return time for diagnostic packet P is longer than the return time for Q) the new routing update message from router A (i.e. at time T+1) is deemed to be suspect and this event is recorded by router J in its system log file. J then takes no action to update its routing message from A or its routing table (in respect of the suspect information from A).

Note, however, that any non-suspect information from any other trusted neighbours would still be used to update the routing table in this embodiment; however, non-significant and therefore non-verified information from router A is also treated as suspicious—even though it has not been actively unverified—and all of the information in A's recent update message is therefore deleted. Thus a new table would be created in which the entry from router A would actually correspond to the update message received from A at time T, whilst the rest of the updates from neighbours I, H and K would be those received at time T+1. In the present example (because the updates from neighbours I, H and K at time T+1 are identical to those received at time T) the net effect coincidentally is for the new table (not shown separately) to be effectively equivalent to Table 1.

If router A keeps sending suspect routing messages (i.e. if the system log detects that more than a specified number of suspect updates have been received from a particular neighbouring router within a predetermined amount of time (or within a predetermined number of update messages), router J sends an alert to the system administrator. Incidentally, in the present embodiment, if one or both of the diagnostic packets are not received before timeout occurs, router J re-attempts the test up to a specified number of times (e.g. 3 times); this is another important feature of the present invention—fault tolerance helps enhance the reliability of the method. If one or both of the diagnostic packets keeps failing to be received prior to timeout occurring, then the router behaves according to the following:

if the packet via the new route keeps timing out, but the packet via the old route does not, the update message is treated as suspicious, and the router behaves in the manner described above for dealing with suspicious updates;

if the packet via the old route keeps timing out but the packet via the new route does not, then the update is treated as valid and the router behaves in the manner described above for dealing with trusted updates; and if both packets keep timing out, it is assumed that there may be some general problem and therefore, to be cautious, the new update is not trusted, but it is not recorded as suspicious in the system log and so does not contribute towards the tally of suspicious updates for the purposes of sending a warning to the system administrator.

The successful transmission and return of the two diagnostic packets is critical to the success of this scheme. Therefore, in the present embodiment, the sequence number of one packet is randomly generated as Y with a significant bit length of 16 (or more if the nature of the diagnostic packet permits this); the sequence number for the other packet is, in the present embodiment, set to (Y+1). This randomly generated sequence number helps to prevent sequence number prediction attacks since even if one or two diagnostic packets are eavesdropped or sniffed, it does not have any impact on any following diagnostic packets. Secondly, data padding is applied to the diagnostic packets, whereby a randomly selected amount of ostensibly useless bits of information (so called padding) is added to the packets, which makes it more difficult for network sniffers to analyse traffic and differentiate the important diagnostic packets from other normal data carrying IP packets.

Figure 4:
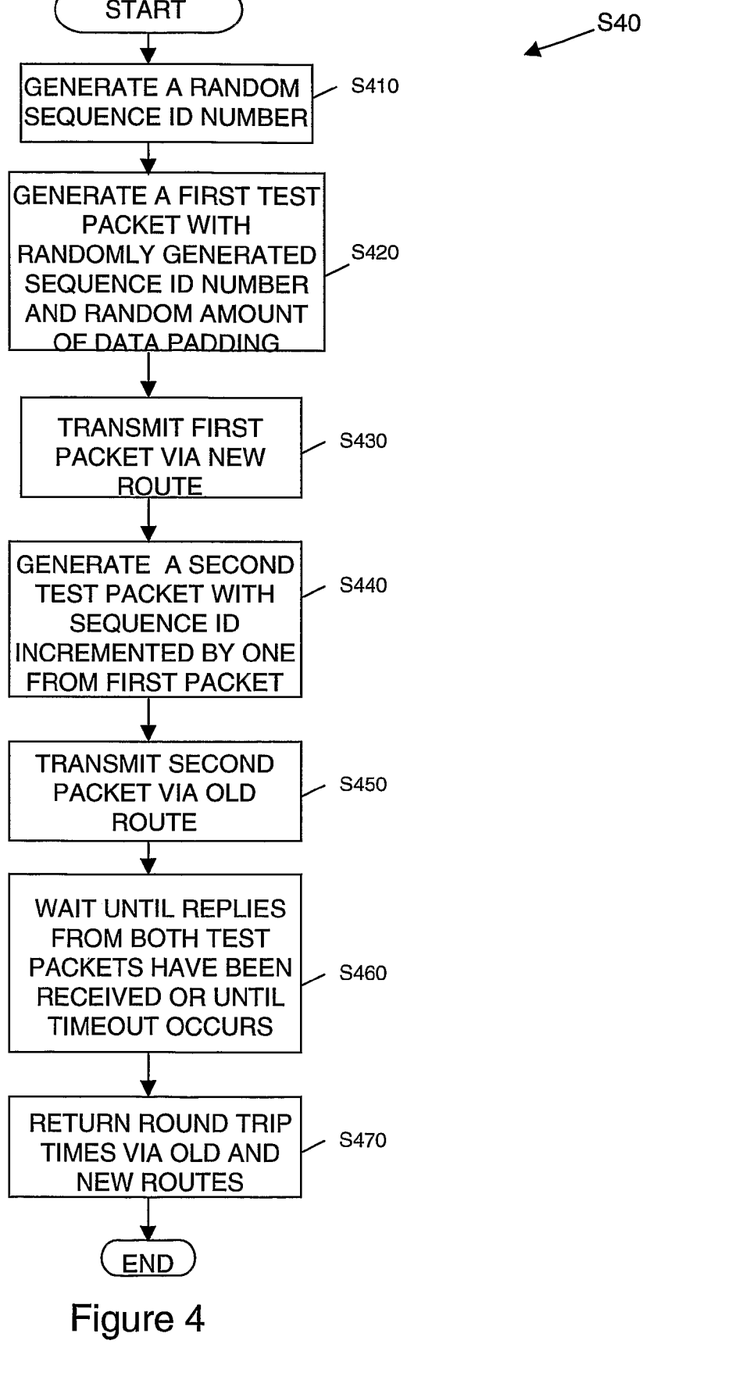
FIG. 4 is a flow chart of the sub-steps of the test subroutine of FIG. 3.

The above described test or verification subroutine as performed in the present invention is illustrated in FIG. 4 as comprising the following sequence of sub-steps. Firstly, in step S410 a random number (Y) is generated for forming the sequence ID in the first diagnostic packet (P). Then, in step S420, the first diagnostic packet (P) is generated (having randomly generated sequence number Y and a random amount of data padding). Then, in step S420, the first packet (P) is transmitted via the new route (e.g. via router A). Then, in step S430 a second test packet (Q) is generated (with a sequence ID Y+1 and a random amount of data padding). In step S450, the second test packet (Q) is transmitted via the old route (e.g. via router H). In step S460 the router waits for both replies to the diagnostic packets to be received and then, at step S470, it reports back the results, i.e. it either reports back the actual round trip times or the one way times to reach the destination where these are available, or alternatively it simply returns which of the diagnostic packets has the lesser delay. In the event that one or both of the diagnostic packets times out before a response is received, actions are taken as described above.

In the present embodiment, the diagnostic packets take the form of timestamp Internet Control Message Protocol (ICMP) messages where the destination router supports these (e.g. router D in the example given above), and simple Echo request and reply ICMP messages if the timestamp messages are not supported by the destination router. Naturally however, in alternative embodiments, any number of different diagnostic packets structures could be devised and employed for performing the function of measuring the delay to certain destination routers; in particular, diagnostic packets which specify an exact route and which ensure that the same route is followed on the return journey could be used, etc.

V-BGP:

1. When one router receives update messages from its neighbours, it does not immediately update its routing table; instead, it analyses the new message by comparing it with its current routing path for BGP.
2. As an example, in FIG. 1, a router J, periodically receives routing information updates from its neighbouring routers A, I, H and K. In router J, the two consecutive (last and current) routing messages from all neighbouring routers are recorded.
3. At time T, router A sends router J its routing path to D as A-B-C-D, in time T+1, this message becomes A-G-D. So router J identifies a significant decrease in the hop count to router D. Router J evaluates if its routing path to router D should be changed using its own "distance" function as in normal BGP (Note: in practice, if A advertises bogus routing information with longer path, A will be automatically isolated from the network. Or if A advertises routing information with longer path because of its policy, J can safely neglect it).
4. If unchanged, router J takes no action.
5. If changed, router J timestamps and sends two similar diagnostic packets P and Q with different sequence numbers to router D via two different routes. Packet P reaches D via router A. Packet Q reaches D via its current routing path. Router D just timestamps (if possible) two diagnostic packets and sends two response packets back as fast as it can. By receiving these two response packets corresponding to two diagnostic packets, router J can then easily calculate which route is shortest on the basis of the travelling time between two routes.
6. If the diagnostic packet travelling via the new route advertised by router A has less packet travelling time, router J categorises router A's update as trustworthy and therefore updates its routing table as usual and renews its two consecutive routing messages sent by all neighbours. Otherwise, the routing information from router A is categorised as suspicious and router J does not update the routing table using the routing information from router A. If the anomaly keeps on happening, router J sends an alert to its system administrator.
7. After this simple verification, bogus routing information from mis-configured or malicious routers can be filtered and terminated by its honest neighbouring router.

Variations

It will be apparent to the reader that many modifications can be made to the above described embodiments without departing from the inventive concept. For example, the diagnostic packet sending procedure could require some sort of authentication from the intended destination router to confirm that the diagnostic packets are not being intercepted and false reply packets being forged (e.g. a so-called man-in-the-middle type attack).

Instead of relying simply on which is the quickest diagnostic packet to be returned, the diagnostic packet sending and receiving procedure could monitor the route taken and could perform a series of tests to measure the times taken to each point along the route (e.g. using functionality similar to the well known "tracert" application). Also, instead of simply accepting the newly advertised information if the advertised route is quicker than the old route, some sort of verification as to the accuracy of the advertised time could be taken (e.g. if a time of 2 msec is advertised but it in fact takes closer to 20 msec, the update could be treated as suspicious even if it is still quicker than the old route).

Many other similar such variations will doubtless occur to a person skilled in the art.

What is claimed is:

1. A method of operating a data network, of the type in which a number of interconnected router devices forward received packets of data towards a destination node in accordance with a routing table associated with each router, the method comprising:
   receiving routing information at one of said routers;
   determining at the router if the information is such that, if it were correct, it would cause the router to update its routing table in respect of one or more entries, and, if so, sending out from the router two test packets, one of which is sent out by the router according to the existing information contained in the router's routing table and the other of which is sent out by the router according to the information which would be included in the routing table if it were updated in accordance with the received information;
   comparing at the router the results of the two test sendings; and
   updating by the router of the routing table to reflect the received information if the comparison by the router indicates that the information received by the router is correct, but otherwise the router ignoring the information and maintaining the routing table unchanged.

2. A method as claimed in claim 1 wherein the packets of data are transmitted over the network using the Internet Protocol.

3. A method as claimed in claim 1 wherein the test packets are generated with random sequence ID numbers.

4. A method as claimed in claim 1 wherein the test packets are sent with a random amount of data padding.

5. A non-transitory computer-readable storage medium containing a computer program or suite of programs operable to cause the method of claim 1 to be performed during execution of the program or programs.

6. A method as claimed in claim 1 wherein if a negative determination is made in said determining at the router if the information is such that, if it were correct, it would cause the router to update its routing table in respect of the one or more entries, then no test packets are sent from the router so that said test packets are only sent from the router if a positive determination is made in said determining at the router if the information is such that, if it were correct, it would cause the router to update its routing table in respect of the one or more entries.

7. A method as claimed in claim 1 wherein the router is a gateway router.

8. A method of operating a router within a data network or internetwork in which data packets may be sent from a source node within the network or internetwork to a destination node via multiple hops between adjacent routers to transmit received data packets towards a destination node, wherein the router maintains a routing table and determines how to forward received data packets requiring onward transmission by consulting the routing table, said method comprising:
   receiving network configuration information;
   determining at the router if the information indicates that the router should modify its routing table in respect of one or more entries, and, if so, performing at the router a test to establish whether or not the routing table should in fact be modified in the manner indicated by the received information, and if so the router updating its routing table accordingly, but otherwise leaving the routing table unamended,
   wherein the test comprises: transmitting from the router two diagnostic packets to a destination node whose route is prospectively to be altered in the routing table in the event of positive test results, via the current route and the prospective new route respectively and determining at the router which route gives rise to the shortest delay.

9. A method of using a router as claimed in claim 8 wherein packets of data to be forwarded are transported over the network using the Internet Protocol.

10. A method of using a router as claimed in claim 8 wherein the test packets are generated with random sequence ID numbers.

11. A method of using a router as claimed in claim 8 wherein the test packets are sent with a random amount of data padding.

12. A method as claimed in claim 8 wherein if a negative determination is made in said determining at the router if the information indicates that the router should modify its routing table in respect of the one or more entries, then no diagnostic packets are transmitted from the router so that said diagnostic packets are only transmitted from the router in said test if a positive determination is made in said determining at the router if the information indicates that the router should modify its routing table in respect of the one or more entries.

13. A method as claimed in claim 8 wherein the router is a gateway router.

14. A router for use in a data network, the router comprising:
   storage means for storing a routing table;
   a plurality of communication ports for transmitting data to and receiving data from interconnected nodes when the router is in use as part of an interconnected network or internetwork of nodes or networks; and
   a processor or group of processors for processing information received at one or more of the communication ports concerning network configuration, and for updating the routing table in accordance with the received network configuration information,
   the processor or group of processors being configured, upon receipt of new network configuration information, to determine if the information indicates that the router should modify its routing table in respect of one or more entries, and, if so, to perform a test to establish whether or not the routing table should in fact be modified in the manner indicated by the received information, and if so to update the routing table accordingly, but otherwise to leave the routing table unamended;
   wherein the test comprises:
   sending out a pair of test packets in respect of each entry which the router determines ought to be changed in view of the received network configuration information,
   wherein one of the test packets of each such pair is sent out according to the existing information contained in the routing table and the other of which is sent out according to the information which would be included in the routing table if it were updated in accordance with the received information.

15. A router according to claim 14 operating in accordance with the Internet Protocol.

16. A router according to claim 14 wherein the test packets are generated with random sequence ID numbers.

17. A router according to claim 14 wherein the test packets are sent with a random amount of data padding.

18. A data network or internetwork comprising a plurality of routers according to claim 14.

19. A router according to claim 14 wherein if a negative determination is made by the processors or group of processors when determining if the information indicates that the router should modify its routing table in respect of the one or more entries, then said test is not performed so that said test is performed only if a positive determination is made when determining if the information indicates that the router should modify its routing table in respect of the one or more entries.

20. A router according to claim 14 wherein the router is a gateway router.

* * * * *